US005594203A

United States Patent [19]

Veermeer

[11] Patent Number: 5,594,203

[45] Date of Patent: Jan. 14, 1997

[54] ELECTRICAL FITTING

[76] Inventor: Christian J. Veermeer, 18 Theresa Avenuc, Camps Bay 8001, South Africa

[21] Appl. No.: 369,806

[22] Filed: Jan. 9, 1995

[30] Foreign Application Priority Data

Jan. 10, 1994 [ZA] South Africa .......................... 94/0118

[51] Int. Cl.$^{6}$ ........................................ G02G 3/08

[52] U.S. Cl. ........................ 174/48; 174/53; 174/58; 220/3.3

[58] Field of Search ....................... 174/53, 48, 58; 220/3.3, 3.4; 439/535

[56] References Cited

U.S. PATENT DOCUMENTS

| | | | |
|---|---|---|---|
| 4,973,797 | 11/1990 | Jorgensen et al. | 174/53 |
| 5,057,980 | 10/1991 | Russell | 220/3.2 X |
| 5,297,011 | 3/1994 | Triunfol | 362/147 |
| 5,349,134 | 9/1994 | Russell | 174/48 |

FOREIGN PATENT DOCUMENTS

| | | | |
|---|---|---|---|
| 600023 | 11/1959 | Italy | 174/48 |

*Primary Examiner*—Hyung S. Sough
*Assistant Examiner*—Paramita Ghosh
*Attorney, Agent, or Firm*—Larson & Taylor

[57] ABSTRACT

An electrical fitting includes a housing for fitting into a recess provided in an outside corner defined by two meeting building walls of a building, or into an inside corner defined by two meeting building walls of a building. The housing includes two side walls provided at an angle to each other, an upper wall and a bottom wall, the walls of the housing defining a chamber in the housing with an open front face; at least one joining formation provided on the housing for joining an electrical conduit leading into the chamber of the housing; and a connection formation for connecting a cover plate to the housing for closing the open front face of the housing. A cut-out is provided in the upper wall and this cut-out can be closed off by means of a removable closure plate.

4 Claims, 6 Drawing Sheets

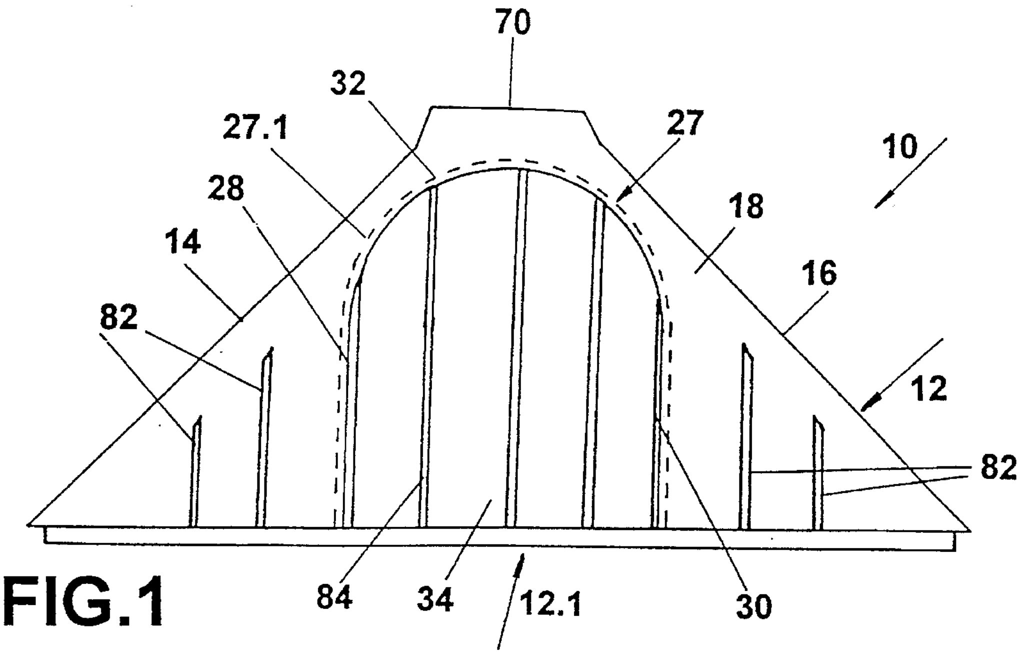
FIG.1
FIG.2
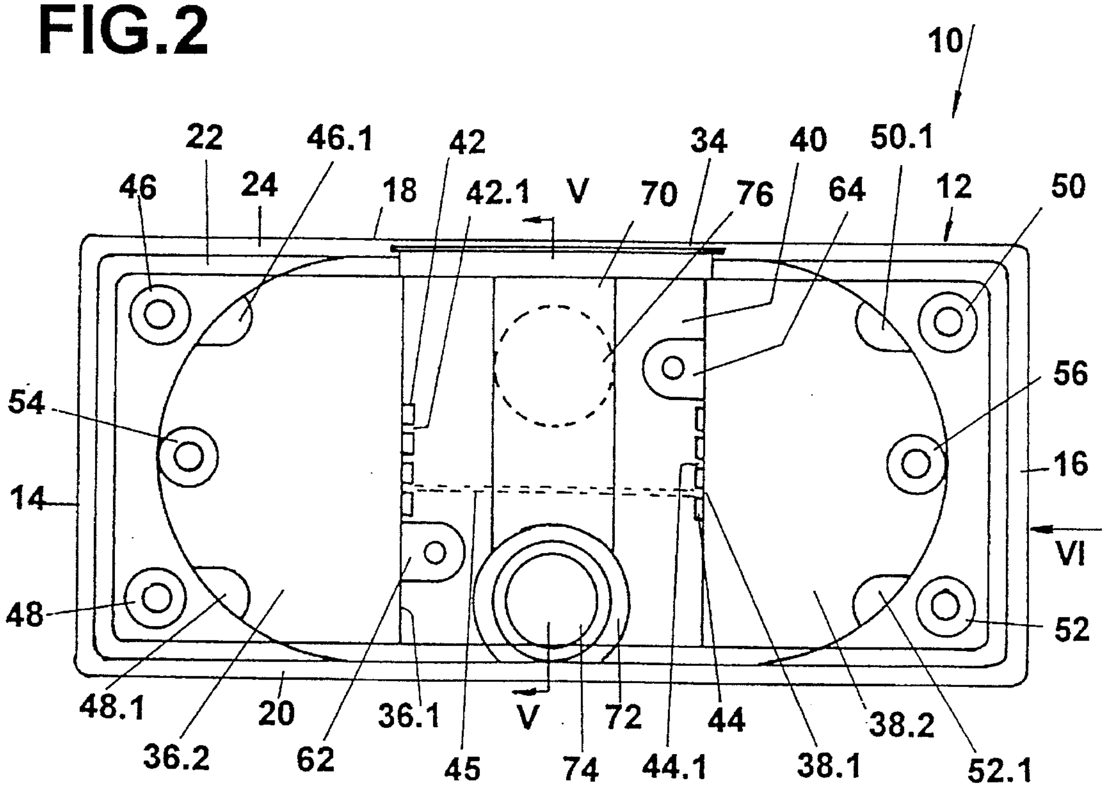

FIG.5
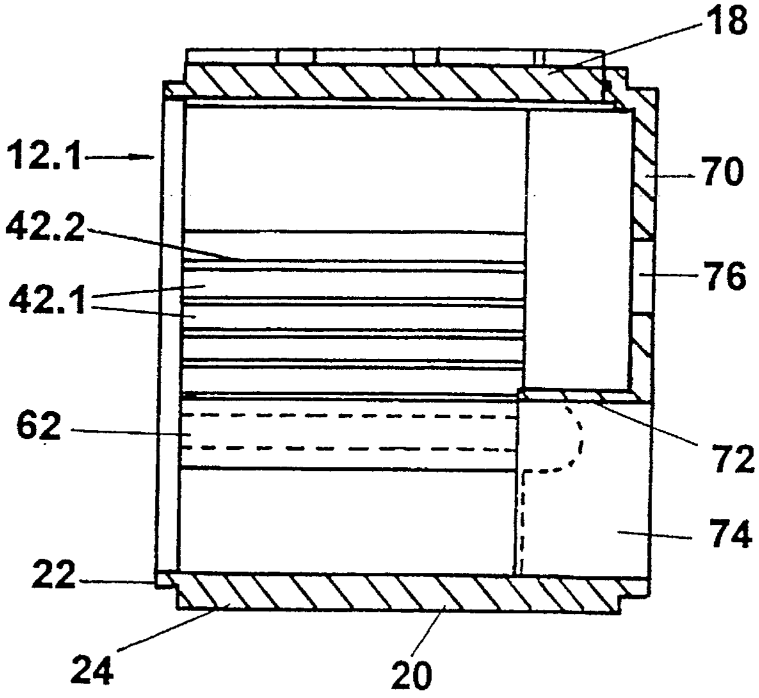
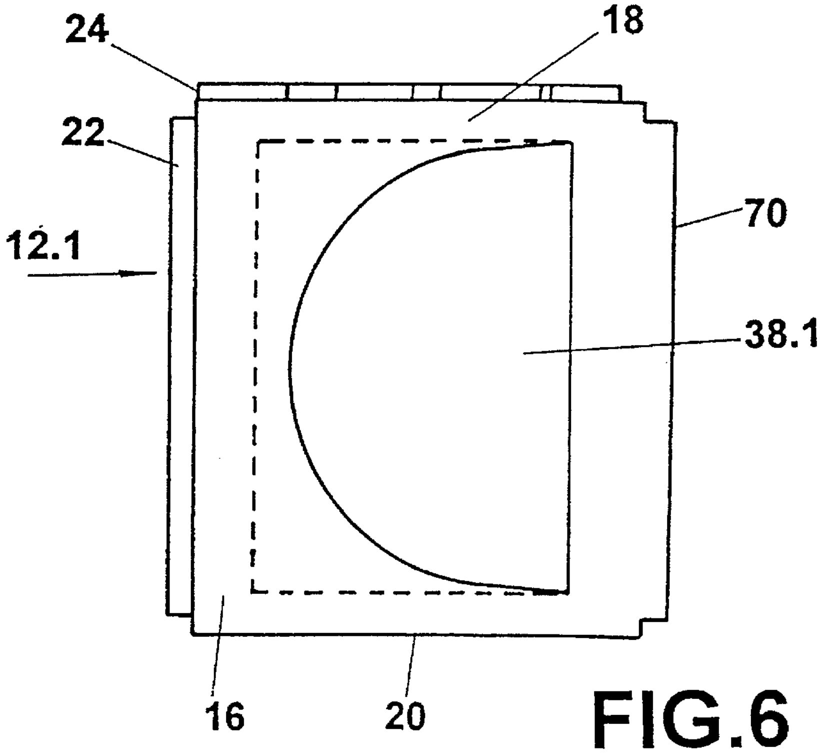
FIG.6

FIG.9
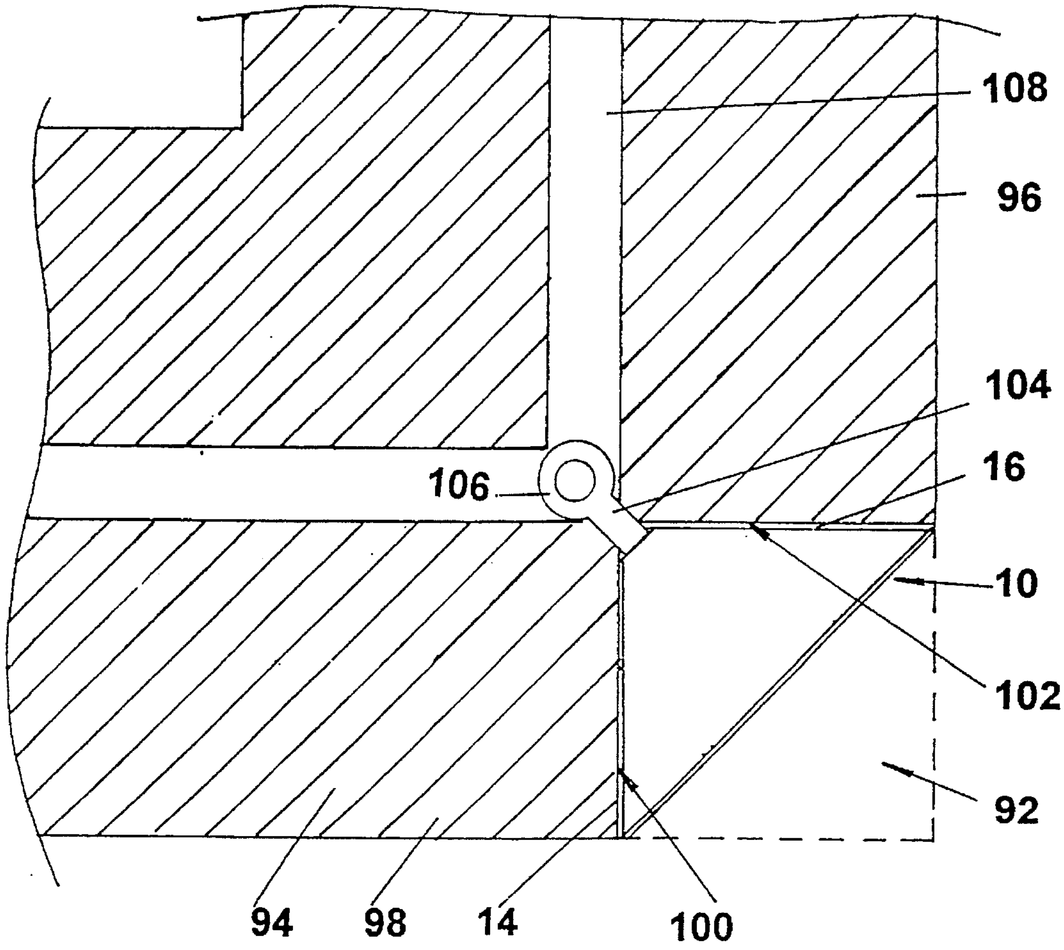
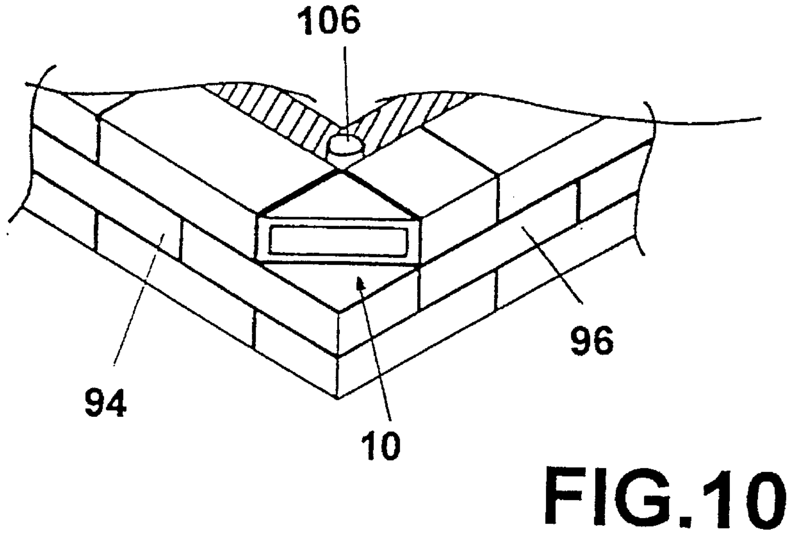
FIG.10

ELECTRICAL FITTING

An electrical fitting is disclosed which includes a housing for fitting into a recess provided in an outside corner defined by two meeting building walls of a building, or into an inside corner defined by two meeting building walls of a building. The housing includes two side walls provided at an angle to each other, an upper wall and a bottom wall, the walls defining a chamber in the housing with an open front face; at least one joining formation provided on the housing for joining an electrical conduit leading into the chamber of the housing; and a connection formation for connecting a cover plate to the housing for closing the open front face of the housing.

FIELD OF INVENTION

The present invention relates to electrical fittings.

More particularly, the invention relates to electrical fittings for fitting onto outside corners or inside corners of building walls.

BACKGROUND TO INVENTION

Various types of electrical fittings, attachable to buildings are known. These fittings are joined to electrical conductors and electrical appliances, such as lamps, are then connected to or mounted on such fittings. The fittings often are not attractive, in particular when mounted at or near corners of buildings.

It is an object of the invention to provide an electrical fitting which can be fitted easily and which should match with the structure or design of a building corner to support a lamp to throw light onto both walls of a building corner or to support another type of electrical appliance.

SUMMARY OF INVENTION

According to the invention, an electrical fitting is provided which includes (a) a housing for fitting into a recess provided in an outside corner defined by two meeting building walls of a building;

(b) the housing including two side walls provided at an angle to each other, an upper wall and a bottom wall;

(c) the walls of the housing defining a chamber in the housing with an open front face;

(d) at least one joining formation provided on the housing for joining an electrical conduit leading into the chamber of the housing;

(e) a connection formation for removably connecting a cover plate to the housing for closing the open front face of the housing;

(f) a cut-out provided in the upper wall; and (g) a removable closure plate for covering the cut-out.

The housing may have a number of spaced apart holding formations in the chamber for supporting a mounting plate below the cut-out onto which an electrical fitting can be mounted.

The fitting may be integrally injection moulded of suitable plastic material.

A circumferential ridge may be formed along the edges of said open front face of the housing for receiving a corresponding groove of the cover plate.

BRIEF DESCRIPTION OF DRAWINGS

The invention will now be described by way of example with reference to the accompanying schematic drawings.

In the drawings there is shown in:

FIG. 1 a plan view of an electrical fitting in accordance with the invention but with the front cover plate of the fitting removed from the housing to uncover the open front face of the housing;

FIG. 2 a front view seen along arrow II in FIG. 1;

FIG. 5 a sectional view seen along arrows V—V in FIG. 2;

FIG. 6 a side view seen along arrow VI in FIG. 2;

FIG. 9 on a reduced scale, a plan view of an outside corner of a building showing the electrical fitting fitted into a recess in the corner;

FIG. 10 a perspective view on the fitting as illustrated in FIG. 9; and

DETAILED DESCRIPTION OF DRAWINGS

Figure 3:
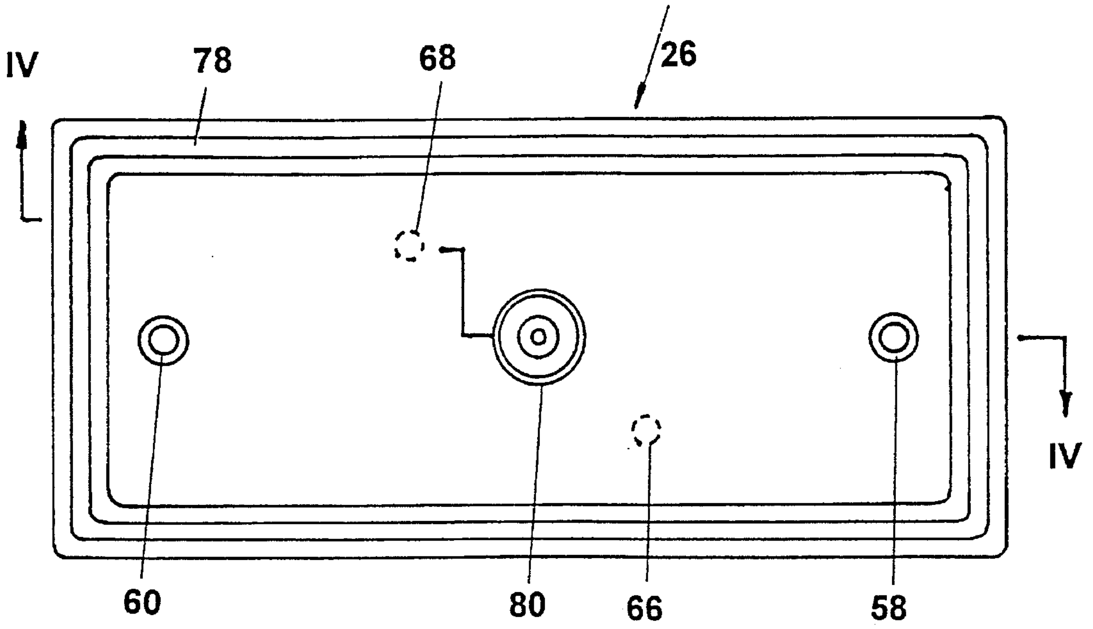
FIG. 3 a view from the inside of the housing illustrated in FIG. 1 onto the front cover plate.

Referring to FIGS. 1 to 7, the electrical fitting in accordance with the invention, generally indicated by reference numeral 10, includes a housing 12 having an open front face 12.1, the housing being constructed by two side walls 14, 16 provided at an angle of 90° to each other, an upper wall 18 and a bottom wall 20.

Figure 4:
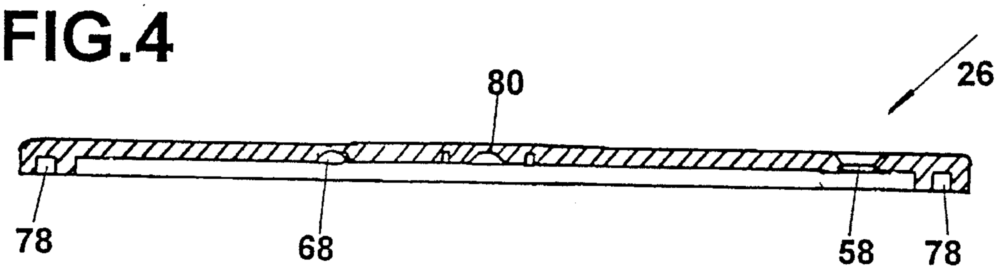
FIG. 4 a sectional side view of the front cover plate seen along arrows IV—IV in FIG. 3.
Figure 7:
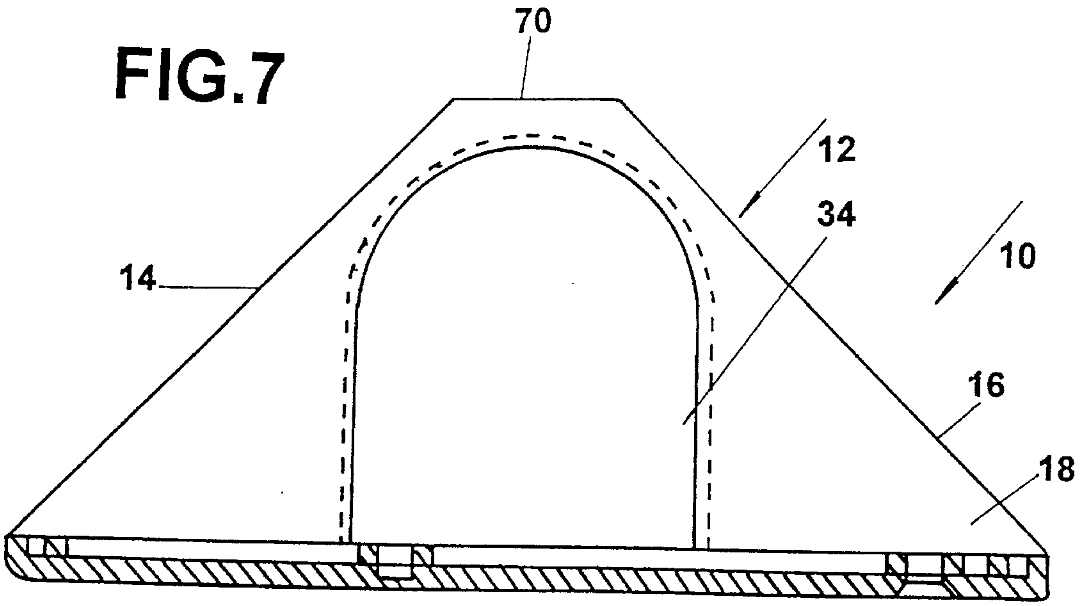
FIG. 7 a view corresponding to FIG. 1 but showing the front cover plate in section and as fitted to the housing.

The front edges of the walls 14, 16, 18, 20 at open front face 12.1 are in rectangular form defining a rectangular ridge 22 which is slightly smaller than the outer circumference of these front edges so that an outside abutting face 24 is defined for the cover plate 26 as shown in FIGS. 3, 4 and 7.

The upper wall 18 has a cut-out 27 having parallel sides 28, 30 and a curved end 32, all of which define a groove 27.1 shown in dotted lines for receiving an associated ridge provided on a slidable cover plate 34.

The side walls 14, 16 have recesses to define parallel walls 36.1, 38.1 and front walls 36.2, 38.2 at the front face 12.1. Thereby a hollow chamber 40 is defined inside the housing 12 between the walls 36.1, 38.1, 36.2, 38.2, 18 and 20.

The walls 36.1, 38.2 support elongated parallel ridges 42, 44 defining straight grooves 42.1, 44.1 respectively. A mounting plate (shown in dotted lines 45) can be fitted at any level in these grooves for mounting a lamp of which the bulb will project upwardly through the cut-out 27 when the plate 34 is removed.

The walls 36.2, 38.2 support hollow cylinders 46, 48 and 50, 52 respectively for receiving screws for attaching the fitting 10 to a wall as shown in FIGS. 9 and 10. Recesses 46.1, 48.1 and 50.1, 50.2 are provided in the meeting covers of the walls 36.1, 36.2 for receiving a screw driver shank when turning a screw through the cylinders 46, 48, 50, 52.

The walls 36.2 and 38.2 furthermore carry hollow cylinders 54, 56 for receiving screws to be passed through the holes 58, 60 of the cover plate 26 for attaching it to the housing 12. The cover plate 26 also has a knock out disc 80, which can be removed to provide a hole through which wires for a lamp fitting or other electrical device mounted on the cover plate 26, can pass.

The walls 36.1, 38.1 support tubular bodies 62, 64 if a lamp or another electrical device is to be fitted whilst the cover plate 26 is attached to the housing 12 by passing through the holes 66, 68 in the cover plate 26.

At the rear or the apex of the housing 12 the side walls 14, 16 are joined by a transverse flat wall 70. In this wall 70 a tubular formation 72 with a hole 74 is provided and also a knock-out disc 76 is located therein.

The hole 74 is intended to receive conventional types of electrical conductors whereas the disc 76 can be knocked out to define a hole through which a conventional type of conduit may be passed and fitted thereto.

Referring to FIGS. 3, 4 and 7 it will be seen that the cover plate 26 has a circumferential groove 78 for receiving the ridge 22 on the front face 12.1 of the housing 12. The cover plate 26 also has a knock out disc 80, which can be removed to provide a hole through which wires for a lamp fitting or other electrical device mounted on the cover plate 26, can pass.

The upper wall 18 and the slidable plate 34 are provided with parallel spacer ridges 82, 84 respectively so that they can support any object, e.g. a glass or a cup, whilst having an air passage between such objects and the surface of the wall 18.

Figure 8:
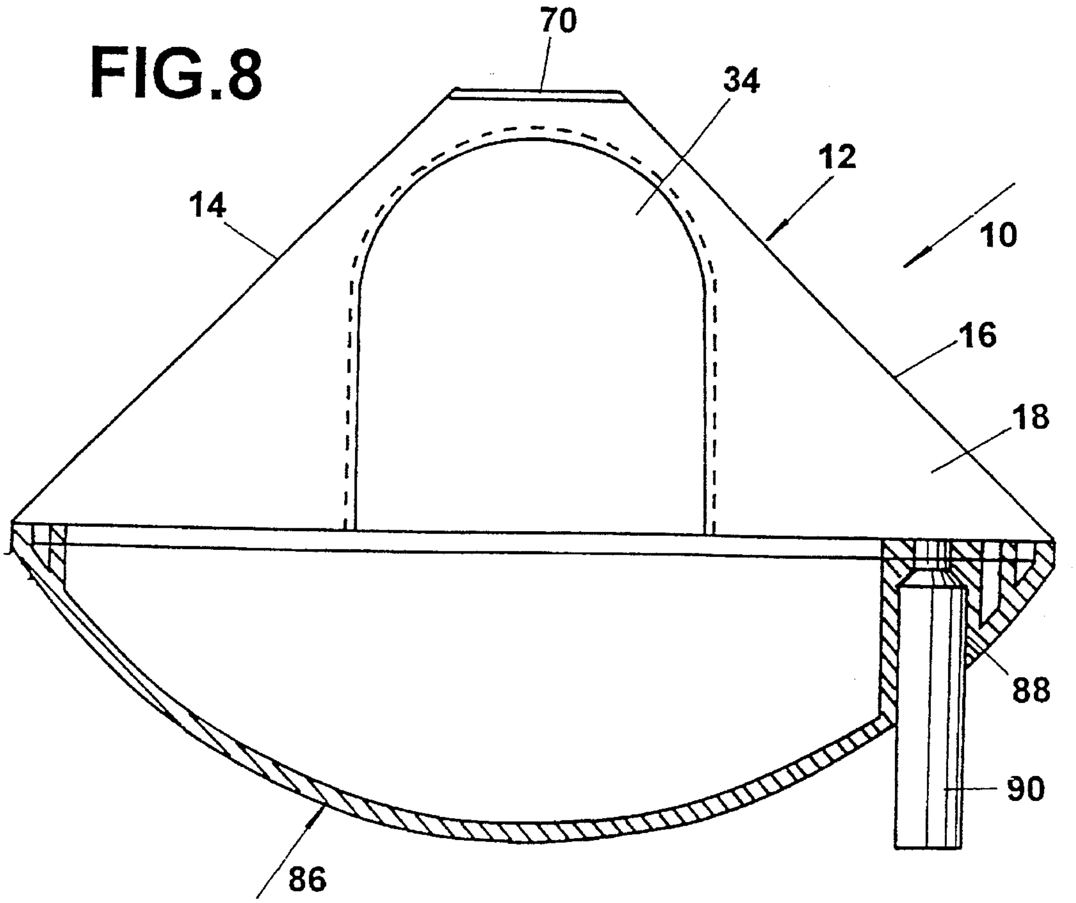
FIG. 8 a view corresponding to FIG. 7 but with a light lens cover fitted onto the housing, the cover being shown in section.

Referring to FIG. 8, in place of the flat front cover plate 26, a curved lens type fitting 86 having a circumferential groove 88 may be fitted to the front face 12.1 of the housing 12. In such a case an electrical light may be fitted suitably inside the housing 12.

The cover 86 has a locating recess 88 for supporting an insert 90, which may carry an advertising plate or the like.

The fitting 10 and its various constituent parts preferably is made integrally of suitable plastics material, e.g. polycarbonate, by way of an injection moulding process.

The cover plate 26 or the curved lens cover 86 are produced separately from the fitting 10.

The cylinders 54, 56, 62, 64 may be adapted to receive self-tapping screws or they may be provided with internally threaded bushes to receive threaded bolts.

Referring to FIGS. 9 and 10 the fitting 10 is shown to be fitted in a recess 92 provided in an outside corner defined by building walls 94, 96.

As is seen from the drawing the side walls 14, 16 have a dimension equivalent to the width of a brick 98.

In use, the fitting 10 is built into a recess 92 provided in an outside corner of the building walls 94, 96, by being placed against the inside faces 100 and 102 of these walls. A detachable tubular connection 104 extends to a conduit tube 106 provided in the cavity 108 of the walls 94, 96. The tubular connection 104 is fitted into the tube 72 in the rear wall 70 of the housing 12.

The tube 106 receives electrical wiring leading through the tubular connection 104 into the chamber 40 where the wiring is connected to an electrical device (e.g. a lamp) as required.

The device 10 can also be fitted into an inside corner of a building without having to provide a recess.

FIGS. 11 to 15 show various lamp fittings as fitted to an electrical fitting of FIG. 1.

Figure 11:
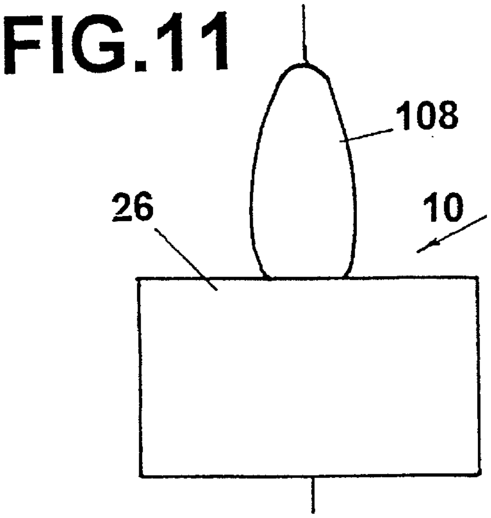
FIGS. 11 to 15 showing various lamp fittings fitted to the electrical fitting of FIG. 1.
Figure 12:
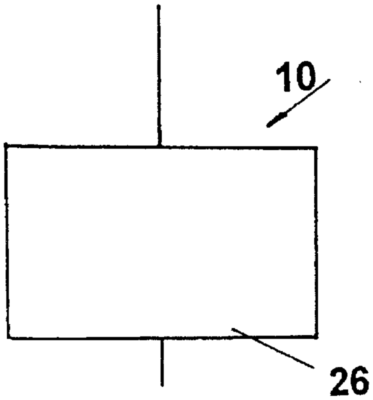

In FIG. 11 a lamp 108 is fitted through the cut-out 27, and in FIG. 12 the housing 12 (or at least the upper wall 18) is made of transparent or translucent material and a light is fitted in the housing.

Figure 13:
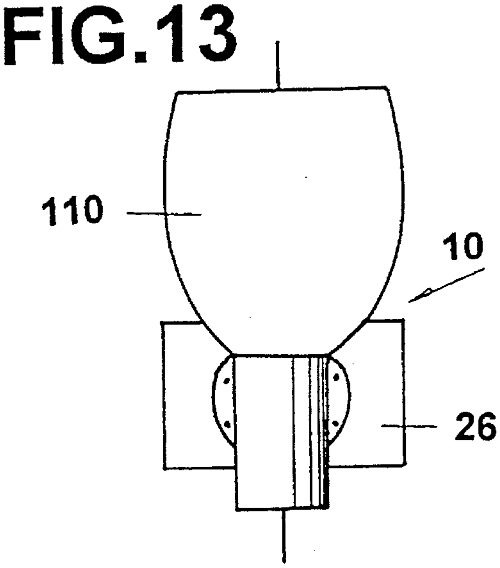
Figure 14:
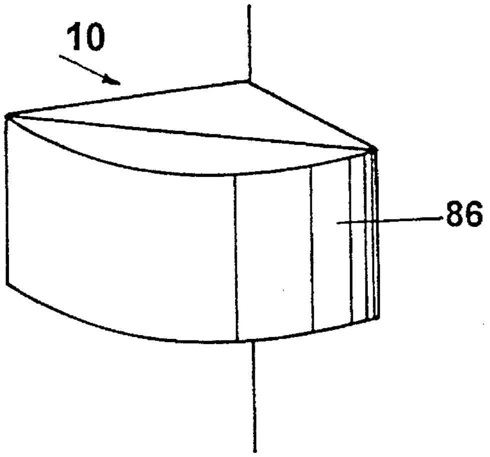
Figure 15:
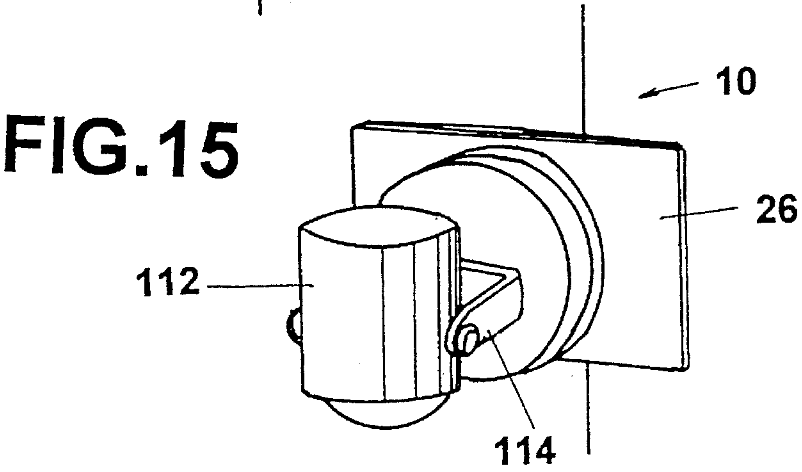

FIG. 13 shows a lamp 110 fitted onto the cover plate 26, and in FIG. 14 a translucent lens 86 (see also FIG. 8) is provided. Finally FIG. 15 shows a lamp 112, which is adjustably supported on a bracket 114 being fitted to the cover plate 26.

I claim:

1. An electrical fitting comprising:

(a) a housing for fitting into a recess provided in an outside corner defined by two meeting building walls of a building;

(b) the housing including two side walls provided at an angle to each other, an upper wall and a bottom wall;

(c) the walls of the housing defining a chamber in the housing with an open front face;

(d) at least one joining formation provided on the housing for joining an electrical conduit leading into the chamber of the housing;

(e) a connection formation for removably connecting a cover plate to the housing for closing the open front face of the housing;

(f) a cut-out provided in the upper wall; and (g) a removable closure plate for covering the cut-out.

2. A fitting as claimed in claim 1, wherein said housing includes a plurality of spaced apart holding formations in the chamber for supporting a mounting plate below the cut-out.

3. A fitting as claimed in claim 1, wherein the fitting comprises an integrally injection moulded unit of a plastic material.

4. A fitting as claimed in claim 1, in which a circumferential ridge is formed along the edges of said open front face of the housing for receiving a corresponding groove of the cover plate.

* * * * *